March 14, 1961 W. H. ZINN 2,975,117
FAST NEUTRON REACTION SYSTEM
Filed Jan. 9, 1947 5 Sheets—Sheet 3

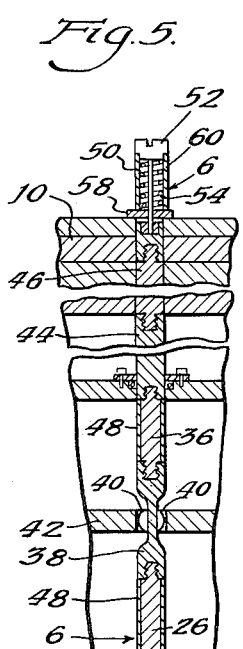
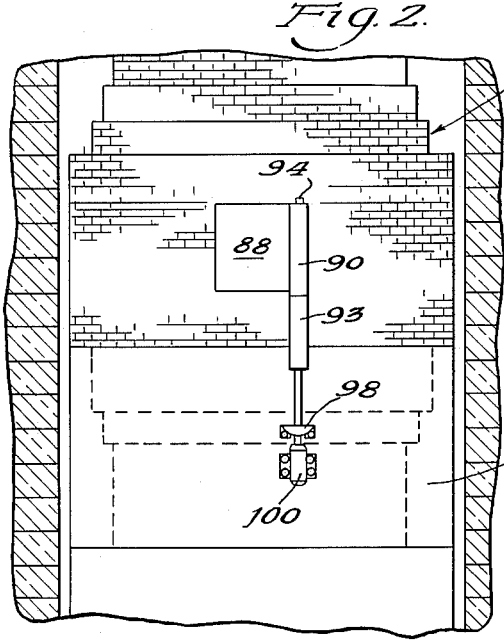
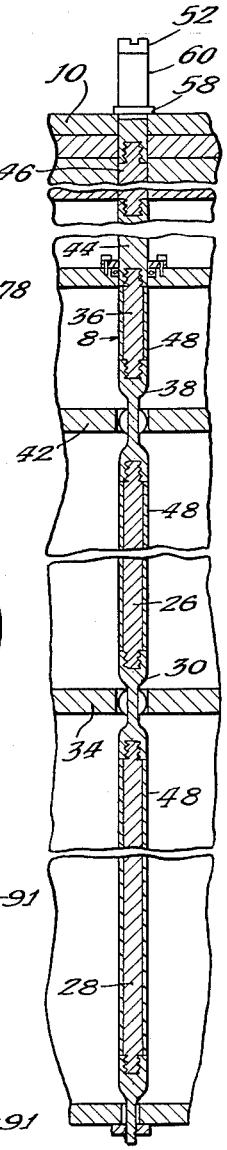
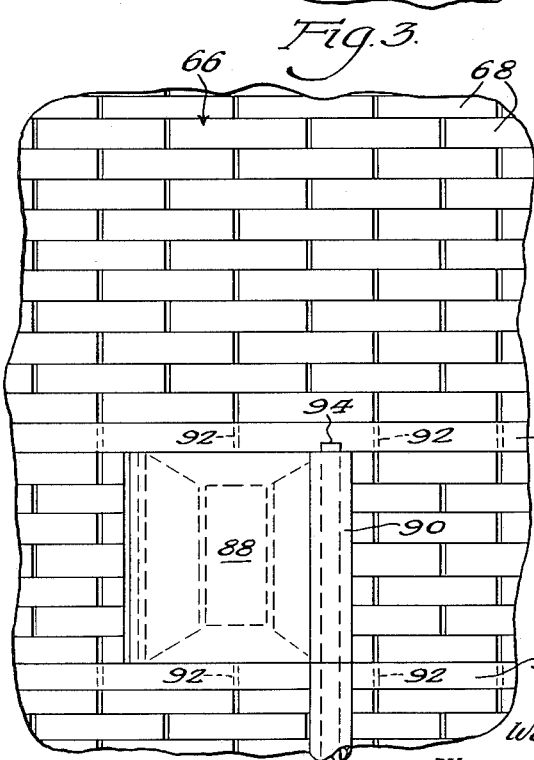

Witness:
Walter S. Schlegel, Jr

INVENTOR.
Walter H. Zinn
BY
Robert A Lavender
Attorney.

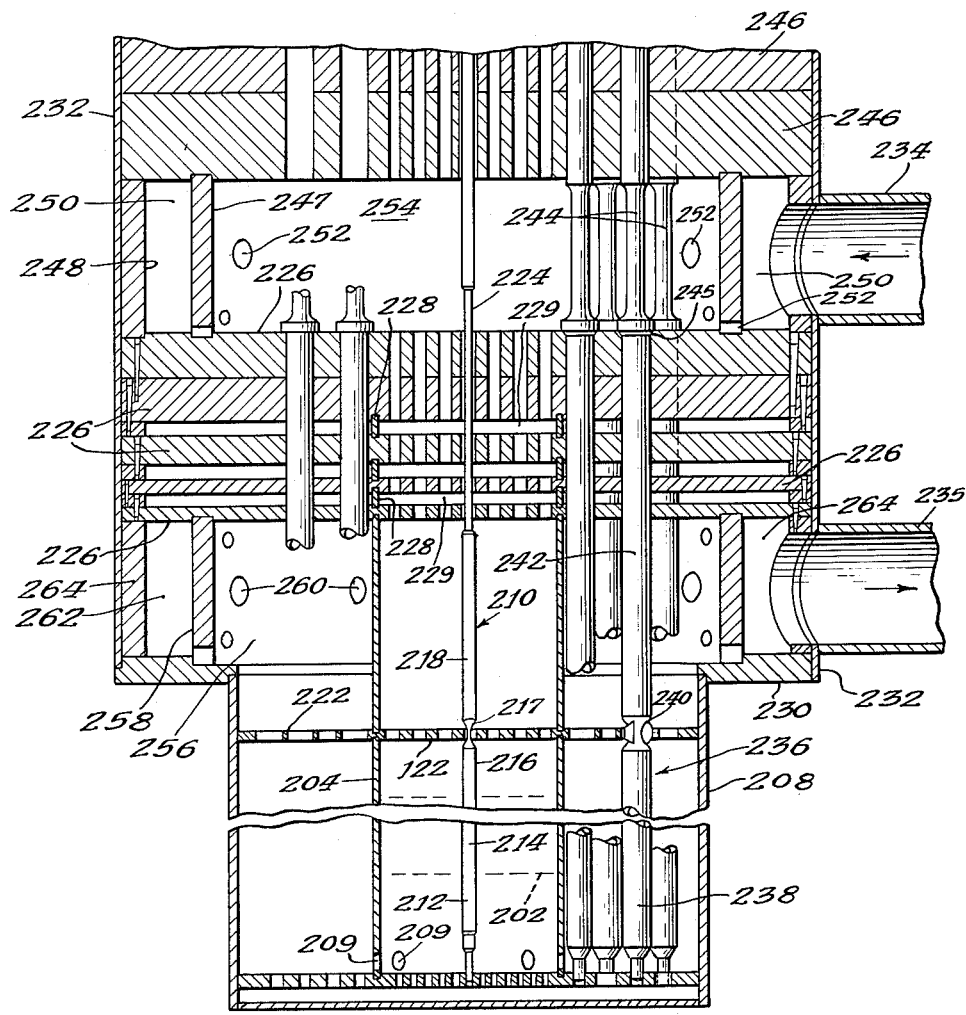

March 14, 1961  W. H. ZINN  2,975,117
FAST NEUTRON REACTION SYSTEM
Filed Jan. 9, 1947  5 Sheets-Sheet 5

Witness:
Walter S. Schlegel, Jr.

INVENTOR.
Walter H. Zinn
By:
Robert A. Lavender
Attorney:

United States Patent Office 2,975,117
Patented Mar. 14, 1961

2,975,117

FAST NEUTRON REACTION SYSTEM

Walter H. Zinn, Chicago, Ill., assignor to the United States of America as represented by the United States Atomic Energy Commission Filed Jan. 9, 1947, Ser. No. 721,108

3 Claims. (Cl. 204—193.2)

This invention relates to nuclear physics, and more particularly to fast neutron nuclear fission chain reaction systems, such as those described in a copending Szilard application, Serial No. 698,334, filed September 20, 1946.

As is more fully discussed in said copending application, fast neutron reactors are particularly advantageous for certain purposes due to their small size and compactness, and also due to the fact that relatively few neutrons are absorbed at high energy values in the non-fissionable components of such reactors. It has been found that neutron absorption losses may be greatly minimized by establishing and maintaining nuclear fission chain reactions while avoiding the slowing of evolved neutrons below an average energy of about 1,000 e.v., and preferably below about 10,000 e.v. At such high energies, it has been discovered that the elements of atomic numbers 11 to 83, which are generally used as structural, cooling, or other elements in a neutronic reactor, have neutron absorption cross sections which are substantially smaller than their absorption cross sections for neutrons at thermal energies. Thus, a substantial saving of neutrons may be effected by maintenance of the high energy level.

Similar advantages may accrue by operating neutronic reactors at lower energies, as for example, even as low as 0.3 e.v., which energy is substantially above the energy of thermal neutrons at room temperature, that is about 0.03 e.v. However, higher energies of 1,000 e.v. and above are preferred inasmuch as non-moderating neutron reflectors may be utilized with reactors operating at these values.

A general object of the present invention is, therefore, to provide a novel method and means for establishing and controlling a fast neutron nuclear fission chain reaction wherein little or no neutron moderator is provided to slow down the neutrons which take part in the chain reaction.

A preferred embodiment of the novel system, as above noted, operates at an average neutron energy of about 1,000 e.v. and preferably within or above the range from 10,000 e.v. to 100,000 e.v. If desired, a neutron energy substantially above thermal energy (at least slightly above 0.3 e.v.) may be maintained with beneficial results as above discussed.

Another object of the invention is to provide a novel method and means for controlling a nuclear fission chain reaction without inserting and withdrawing control elements with respect thereto.

A more specific object of the invention is to provide a novel method and means for controlling a fast neutron nuclear fission chain reaction by regulating the neutron leakage from the periphery of the reaction zone.

A further object of the invention is to provide a non-moderating fast neutron reflector around a fast neutron reactor, such as above-described, said reflector being surrounded by an intermediate non-moderating reflector which is, in turn, surrounded by an outer neutron moderating reflector. A variable aperture or orifice is provided in the intermediate reflector to regulate the escape of neutrons therethrough, the moderated neutrons flowing toward the reactor through said aperture being captured by the inner reflector.

A different object of the invention is to provide a novel method and means for assembling and disassembling the intermediate non-moderating neutron reflector with respect to the fast neutron reactor.

Still another object of the invention is to provide a novel method and means for terminating the fast neutron chain reaction under emergency conditions by moving the entire intermediate fast neutron reflector out of cooperative relationship therewith.

Still another object of the invention is to design a novel heat transfer system for a neutronic reactor wherein the coolant flows in series through the reactor and a neutron reflector therearound, thereby maintaining the entire structure at a substantially uniform temperature value and accommodating a maximum exit temperature for the coolant without the necessity of providing means for throttling the flow thereof. It will be understood, as hereinafter discussed, that such an arrangement is particularly useful for power plants wherein the heat absorbed by the coolant from the nuclear fission chain reaction is conveyed by the coolant to an associated power device.

The foregoing and other objects and advantages of the invention will become apparent from a consideration of the following specification and the accompanying drawings, wherein:

Fig. 2 is a fragmentary side elevation taken from the left as seen in Fig. 1, portions of the structure being shown in vertical section;

Fig. 3 is an enlarged fragmentary side elevation corresponding to the view of Fig. 2;

Figs. 5 and 6 are fragmentary vertical sectional views illustrating respectively a reactive rod and a reflector rod shown in Figs. 1 and 4;

Fig. 7 is a central vertical sectional view partly in elevation of a modification of the reactor structure and inner fast neutron reflector therearound.

Figure 1:
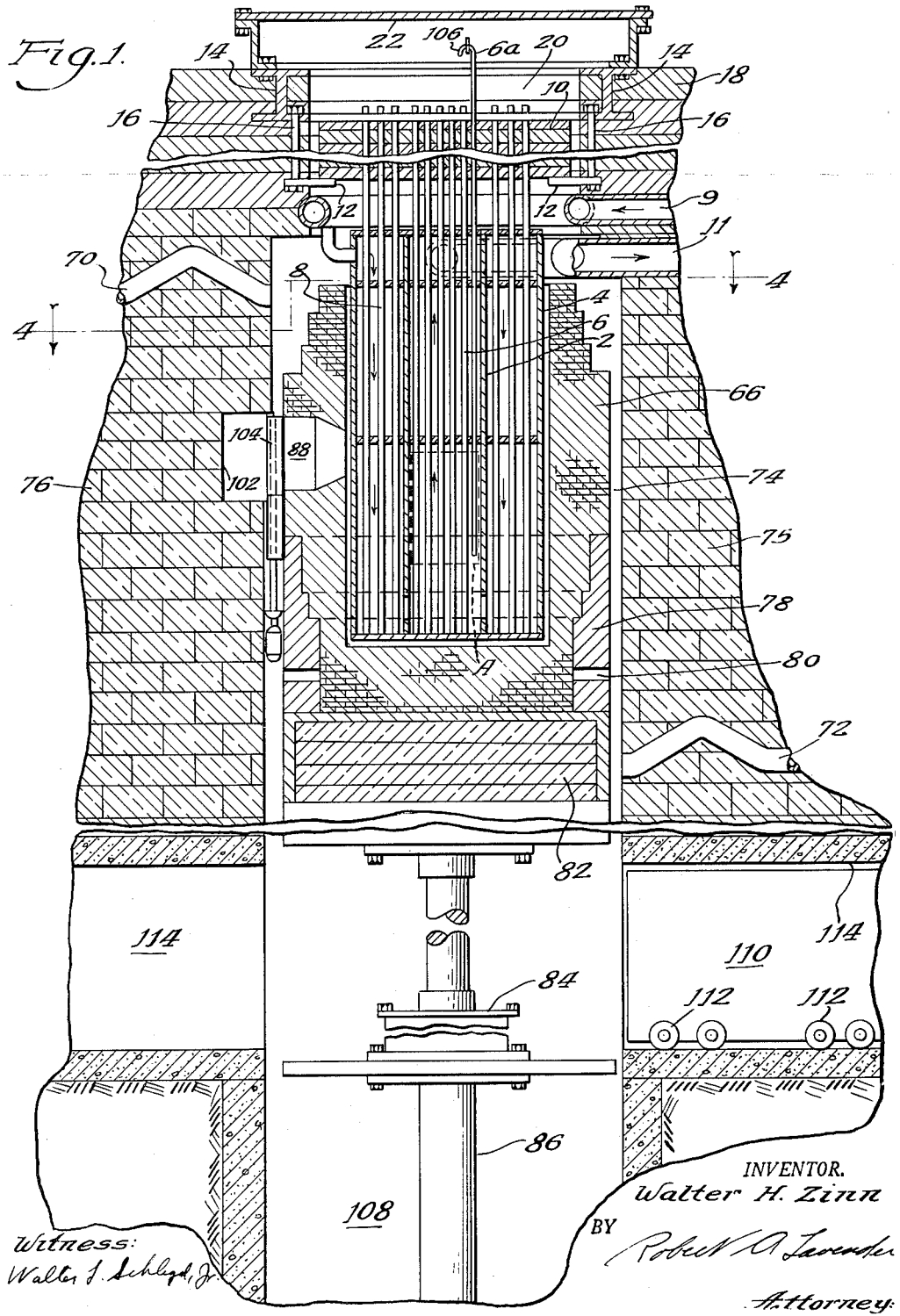
Fig. 1 is a side view of a preferred embodiment of the invention, portions of this view being shown in vertical section and other portions in side elevation.

Describing the invention in detail and referring first to Figs. 1–4, the system shown therein comprises inner and outer steel tanks 2 and 4 (Figs. 1 and 4), the inner tank containing a plurality of composite rods 6 and the outer tank containing a plurality of composite rods 8, all of said rods being supported, as hereinafter described in detail, from a biological shield 10 composed of any suitable material adapted to absorb biologically harmful emanations, such as neutrons and alpha, beta, and gamma rays.

The shield 10 is supported by fingers 12 connected to I beams 14 as by bolts 16, the beams being mounted within a biological shield 18 with a central opening 20 accommodating the before-mentioned shield 10. The top of the opening 20 is closed by a cover plate 22, which may be removed to accommodate assembly and disassembly of the rods 6 and 8.

One of the rods 6 is shown in detail in Fig. 5 and comprises a cylindrical segment 24 composed of thermally fissionable material. It is disposed between cylindrical segments 26 and 28 composed principally of "fertile" material. Fertile isotopes or material as hereby defined are fissionable by fast neutrons, are substantially non-fissionable by slow neutrons, and absorb or capture neutrons fast or slow to undergo nuclear reaction productive of fissionable material, as for example, the isotopes $Th^{232}$ and $U^{238}$ which are converted to $U^{233}$ and $Pu^{239}$ respectively by nuclear reaction under neutron bombardment. Fertile isotopes are capable of scattering fast neutrons by inelastic collision therewith, and are thus particularly useful as fast neutron reflectors adapted to reflect neutrons escaping from the central or reaction zone of the reactor. The term thermally fissionable isotopes or material, as used herein, designates those isotopes such as $U^{233}$, $U^{235}$ or $Pu^{239}$, which are fissionable by slow or thermal neutrons and have a high fission cross section for fast neutrons relative to the fission cross-section of isotopes which are not fissionable by thermal neutrons.

The segment 24 is connected to the segments 26 and 28 by steel couplings 30 and 32, respectively, the coupling 30 being provided with spaced fins 31 adapted to center the rod 6 in an opening through a wall or partition 34 within the tank 2. The segment 26 is connected to a cylindrical beryllium segment 36 by a coupling 38 formed with fins 40 adapted to center the rod 6 in an opening within a wall 42 of the tank 2. The beryllium segment 36 is connected to an iron segment 44, which is, in turn, connected to another beryllium segment 46. The beryllium segments 36 and 46 are disposed within the biological shield 10 and form a part thereof. All of the segments below segment 44 are closed within thin walled tubes or sheaths 48 adapted to space the segments from a coolant circulated through the system, as hereinafter described, for the purpose of absorbing the heat of nuclear fission chain reaction.

The rod 6 is supported from the shield 10 by a spring 50 bearing against a cap 52 connected by a pin or spindle 54 to the top beryllium segment 46, said spring being seated against a spring plate 58 bearing against the top of the shield 10. The cap carries a sleeve 60 enclosing the spring 50. The spring 50 functions to place the rod 6 under tension inasmuch as the bottom thereof is interlocked to the bottom wall 62 of the tank 2. Thus, any tendency of the rod to warp due to the heat of the reaction is resisted by the tension on the rod.

Figure 4:
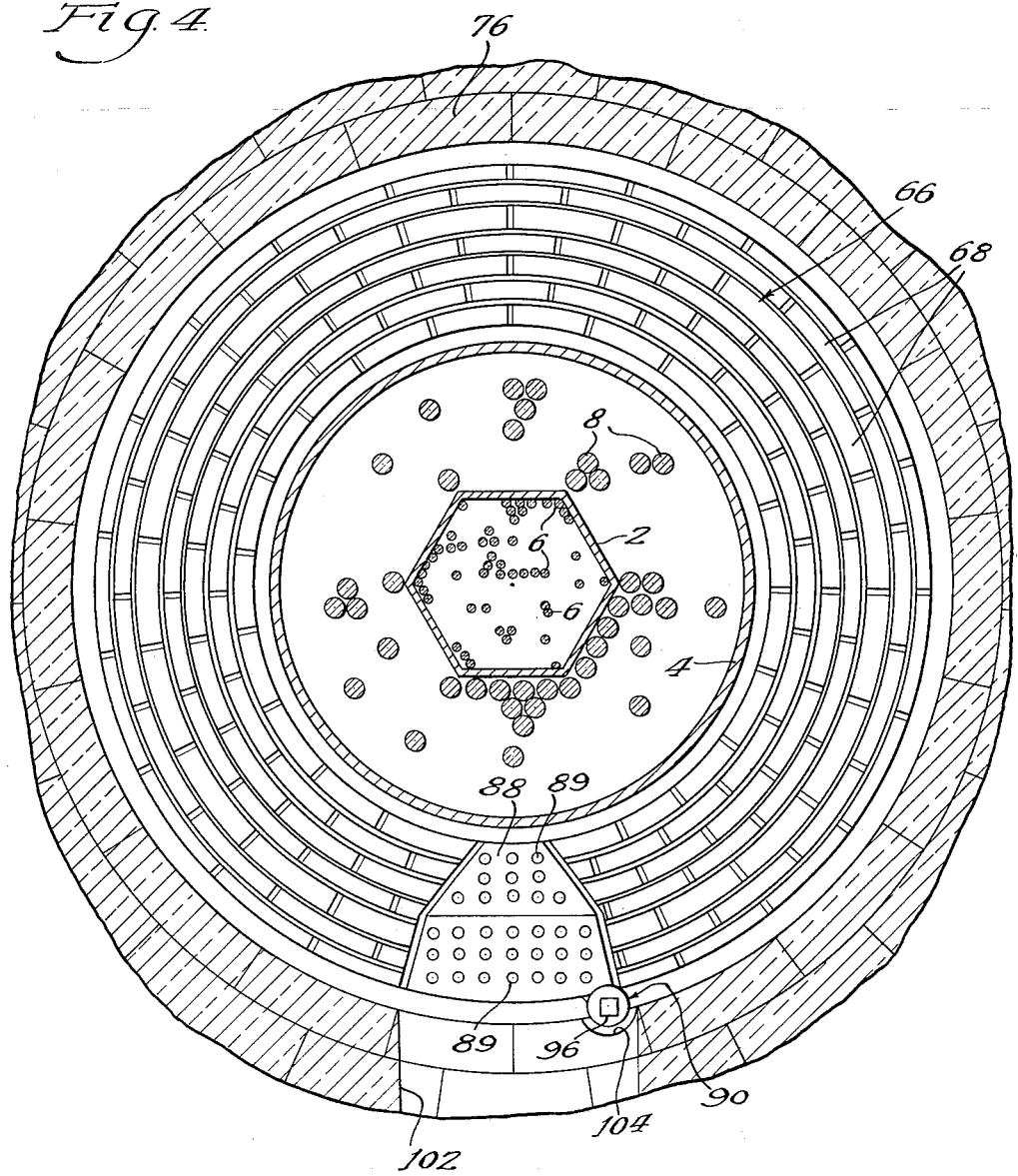
Fig. 4 is an enlarged cross sectional view taken on the line 4—4 of Fig. 1.

The rods 6 are spaced apart .046" and are disposed about .494" apart, center to center. The diameter of each segment is about .394" and the outside diameter of the jacketed segment is about .448". About 170 active rods 6 are utilized in an arrangement wherein the thermally fissionable material is substantially pure $U^{235}$. The inner tank 2, which is hexagonal is shown in Fig. 4, and is about 6.688" in width between parallel sides thereof.

One of the rods 8 is shown in detail in Fig. 6 and is substantially identical with the rod 6 except for the larger diameter of the rod 8 and the elimination of the thermally fissionable segment 24. The portions of the rod 8 (Fig. 6) corresponding to those of the rod 6 (Fig. 5) are identified by corresponding numerals, and it will be seen that the bottom segment of the rod 8 containing fertile material is longer than the corresponding segment 28 of the rod 6 because of the elimination of the thermally fissionable segment 24 from the rod 8. The rods 8, as above-noted, are contained within the tank 4, and are preferably about .875" in diameter. They are spaced apart about .916" center to center, thus providing a space of about .041" between the closest portions of adjacent rods. The jackets 48 of the rods 8 as well as the rods 6 have a wall thickness of .027". In the instant embodiment of the invention one-hundred and ninety-two rods 8 are utilized.

The rods 6 and 8 are cooled by any suitable coolant such as molten bismuth or a sodium potassium alloy circulated as indicated by the arrows in Fig. 1 by inlet and outlet conduits 9 and 11. The inlet conduit is connected to the outer tank 4 and the coolant flows downwardly therethrough into the tank 2 through ports at the bottom thereof and upwardly therethrough into the outlet conduit 11. Thus, the coolant absorbs the heat of the nuclear fission chain reaction and the energy in the form of heat carried from the reactor by the coolant may be utilized for power or other purposes, if desired.

Referring again to Fig. 1, it will be seen that the thermally fissionable segments 24 of the rods 6 constitute a reactive portion indicated at A, wherein the nuclear chain reaction is sustained, said reactive portion being entirely surrounded by fertile material within the rods 6 and 8. This blanket of fertile material surrounding the reactor A not only absorbs neutrons to produce thermally fissionable material, as above discussed, but also functions as a non-moderating fast neutron reflector, which reflects or scatters fast neutrons escaping from the reactor A by inelastic collision with the atoms of fertile material, thus reflecting the escaping neutrons back into the reactor to diminish neutron losses from the periphery thereof, thereby decreasing the critical size at which said reactor is capable of sustaining a chain reaction.

The reflector defined by the fertile material in the rods 6 and 8 is surrounded, except for the top thereof, by an outer reflector 66 (Fig. 1) composed principally of fertile material, as for example, bricks or blocks 68 (Figs. 3 and 4) of neutronically pure natural uranium, the principal component of which is $U^{238}$. The blocks 68 are arranged in annular rows or series spaced radially from the longitudinal axis or center line of the tanks 2 and 4, and the blocks of each row or series are spaced apart, as best seen in Fig. 4. Each row of blocks, as best seen in Figs. 2 and 3, comprises a plurality of horizontal layers, the spaces between the blocks of the respective layers being vertically staggered or misaligned, as seen in Fig. 3. Thus, the reflector 66 is provided with a multiplicity of passages defined by the space between the blocks to afford passage of a coolant such as air or helium under pressure circulated by inlet and outlet conduits 70 and 72 (Fig. 1). This coolant passes through a reaction chamber 74 containing the tanks 2 and 4 and the reflector 66, said chamber being defined by a neutron moderating reflector or blanket 76 formed, for example, of blocks of graphite or beryllium.

The reflector 66 is formed with a smaller number of the radially spaced rows of blocks 68 at the top and bottom of the reflector than at the center thereof, inasmuch as the neutron density is normally greatest in the reflector at that point. Thus, the blocks 68 are supported by a steel ring 78, the inner surface of which is stepped to accommodate the above-described arrangement of the blocks. The ring 78 is provided with one or more coolant passages 80 (Fig. 1) to accommodate flow of the before-mentioned reflector coolant between the bricks 68 constituting the bottom of the reflector 66. The ring 78 is supported by a biological shield 82 (Fig. 1) mounted on a pneumatic or hydraulic hoist 84, which is, in turn, supported by a pedestal or column 86 adapted to be raised and lowered by any suitable device, such as an hydraulic or screw hoist (not shown) for a purpose hereinafter discussed.

The nuclear fission chain reaction within the reactor A is normally controlled by a door 88 in the outer reflector 66, said door preferably being principally composed of fertile material, as for example, a block of neutronically pure natural uranium. The door is bevelled on the inner surface thereof, as clearly seen in Figs. 1 and 4, to define angular paths with the margins of the complementary opening through the reflector 66, thus substantially preventing the escape of neutrons through said opening when the door is in its closed position as is illustrated in the drawings. The door is preferably provided with a plurality of vertical openings 89 (Fig. 4) therethrough to accommodate flow of the before-mentioned coolant, thus preventing the development of excessive heat within the door due to neutron bombardment thereof. Referring to Fig. 3, it will be seen that the blocks 68 comprising the layers immediately above and immediately below the door 88 are replaced by a pair of annular uranium plates 91, provided with openings or perforations 92 adapted to accommodate flow of the reflector coolant therethrough, said plates 91 affording a good structural support for the blocks above and at the sides of the opening through the reflector 66.

The door is provided with a hub 90 seated on a sleeve or bearing 93 mounted in any convenient manner, as for example, by welding on the ring 78 adjacent the upper edge thereof. A shaft 94 (Figs. 2–4) extends through the bearing 93 and is provided with a square end 96 (Fig. 4) fitted within a complementary opening in the hub 90. The shaft extends downwardly from the bearing 93 through a conventional roller bearing unit 98 mounted on the ring 78, and the shaft is connected at its lower extremity to a motor 100 adapted to rotate the shaft, thus actuating the door to the open and closed positions thereof. The reflector 76 is provided with a recess 102 and a vertical groove 104. The recess 102 is adapted to receive the door as the latter is actuated to its open position, and the groove 104 is adapted to accommodate vertical movement of the hub 90 and bearing 92 during the elevation and lowering of the reflector 66, as hereinafter described.

It has been found that when the door 88 is open, fast neutrons escaping therethrough are scattered through the reaction chamber 74 and are slowed by elastic collision with the atoms of neutron moderator constituting the reflector 76. Thus, the slowed neutrons are unable to penetrate the fertile material constituting the inner and outer reflectors around the reactor A, and are, for the most part, absorbed by this fertile material or by the wall of the outer tank 4. This loss of neutrons reduces the neutron reproduction ratio of the reactor A and thus by adjusting the door 88 this ratio may be brought to values above and below unity, thereby accommodating regulation of the neutron density within the system. It will be understood that while one relatively large door 88 is illustrated in the drawings, if desired, any number of such doors of any suitable size may be utilized for the purpose of regulating the reaction.

Emergency control may be effected by dropping the reflector 66 by means of the hoist 84 or, if desired, emergency control may be achieved by elevating one or more of the reactive rods within the tank 2, said rod being designated at 6a in Fig. 1 and being identical with the rods 6, except that it is not secured to the bottom wall of the tank 2. Each rod 6a is provided with a coupling 106 (Fig. 1) at its upper extremity for convenient connection to an actuating mechanism (not shown) supported, for example, by the cover plate 22.

It will be understood that from time to time it is desirable to remove the blocks 68 constituting the outer reflector 66, and this is accomplished by actuating the hoist 84 and the column 86 to lower the reflector 66 into a handling chamber 108 (Fig. 1), whereupon a biological shield 110 is moved, as for example, by means of wheels 112 through a chamber 114 to a position beneath the reactor A and above the handling chamber 108. Thereafter the reflector 66 may be disassembled for the purpose of recovering the thermally fissionable material formed within the blocks 68 and a new reflector may be assembled on the ring 78, and may be elevated therewith into position around the reactor A, as shown in Fig. 1.

Assuming that the thermally fissionable segments 24 are composed of $U^{235}$, the amount required for the above-described reactor is determined by the concentration of this isotope in the segments. If the segments 24 are formed of enriched uranium containing $U^{235}$ in concentration of the order of 90 percent, the total amount of enriched uranium would be about 45 kilograms containing about 40 kilograms of $U^{235}$. Under certain circumstances wherein it is desirable to raise the number of kilowatts per kilogram of $U^{235}$, it may be desirable to use this material in more dilute form. For example, enriched uranium containing $U^{235}$ in concentration of the order of 35 percent would sustain a reaction in a device such as above-described if 100 kilograms of $U^{235}$ were provided in the reactor. It may be noted that a smaller quantity of $Pu^{239}$ in the reactor A would be necessary to sustain a reaction, all other factors being equal, inasmuch as a greater number of neutrons are emitted on the average by plutonium atoms during fissioning thereof than are emitted by $U^{235}$ atoms.

For an estimation of the breeding gain in thermally fissionable material, the geometry of the reactor and the pertinent nuclear constants must be considered. The following estimates have been made for the above geometry using reasonable values of the nuclear constants based on actual measurements:

*Internal portion of reactor*

| Material | Relative Volume of Components | Relative Neutron Absorption |
|---|---|---|
| $U^{235}$ | 1 | 1 |
| Fe | 0.4 | 0.01 |
| Na-K alloy (50% by wgt. of each) | 0.4 | 0.0 |

*Reactor blanket*

| Material | Relative Volume of Components | Relative Neutron Absorption |
|---|---|---|
| Natural Uranium | 1 | 1 |
| Fe | 0.4 | 0.08 |
| Na-K alloy (50% by wgt. of each) | 0.4 | 0.01 |

In the above tables are listed in the first column the materials of the reactor and in the second the relative volume of these materials in terms of the volume of $U^{235}$ and natural uranium in the first and second tables, respectively. The third column indicates the relative number of neutrons absorbed by the various components. It is to be noted that in the reactor proper the absorption of neutrons due to the iron and due to the sodium potassium in the coolant is negligible compared to the neutrons absorbed by the $U^{235}$. This is not true, however, for the reflector, and it is believed that the numbers given in the table for the fraction of neutrons absorbed in the iron and in the alloy coolant in the reflector are high since these calculations assume that all of the blanket is iron jacketed and cooled by the alloy. As above-described, however, the outer reflector 66 is so designed that neither iron nor cooling metal will be present. The other serious loss of neutrons from the reactor is in the upper direction where channels are provided for removing the rods from the device. It may be noted that by lengthening the segments 26 of these rods sufficiently that the loss in this direction can be held down to that estimated for the other parts of the reflector. Fir the conditions outlined here the breeding gain, that is, the extra few fissionable atoms formed for those consumed, is estimated to be between 0.15 and 0.2. More explicitly, this means that for each $U^{235}$ atom consumed between 1.15 and 1.2 new $Pu^{239}$ atoms are generated. It should be pointed out that for most purposes concerning the chain reaction $Pu^{239}$ is considerably more effective or more valuable than $U^{235}$, so that more is gained by this conversion than is indicated by these numbers.

It will also be apparent that the reactor shown in the above figures comprises a central active region surrounded by a blanket of thorium or uranium which blanket itself is surrounded by a second blanket comprising a neutron moderator capable of slowing neutrons to thermal energy such as carbon, water, deuterium oxide, beryllium or other elements of low thermal neutron cross-section and atomic numbers below about 10. The thorium or uranium blanket not only serves as a non-moderating fast neutron reflector as above described, but also functions in the nature of a filter or screen for most neutrons of relatively low energies, for example, 0.01 to 10 electron volts. Thus, the fast neutrons leaving the central active area are either reflected or captured by the blanket or passed through the blanket into the neutron moderator where they are slowed to low energies, usually to thermal energies. These low energy neutrons are then available for breeding purposes.

It is usually desirable to prevent or minimize the return of thermal neutrons into the active area, thus minimizing the loss of neutrons to materials of the active portion which serve for heat-removal, mechanical supports, and other non-neutronic purposes, and further minimizing the problems of radioactivity hazards in connection with the coolant system. The uranium or thorium blanket serves this function and absorbs most of the thermal neutrons which are reflected inwardly from the neutron moderator blanket.

It will be understood that other means may be utilized to prevent or minimize the return of slow or thermal neutrons into the central fast neutron active area, for example, a blanket of cadmium, barium, gadolinium or other isotope having a high neutron capture cross-section for slow neutrons may be provided between the active area and the neutron moderating blanket for this purpose. Likewise, numerous other high neutron absorbers usually having an atomic number below about 80 may be used for this purpose.

Referring now to Fig. 7, a modification of the reactor and associated coolant system is shown wherein the reactor generally designated 202 is contained within a cylindrical tank 204 surrounded by a tank 208 and connected thereto by ports 209. The tank 202 contains a plurality of reactive or fuel rods, one of which is shown at 210. Each rod 210 comprises a bottom segment 212 of fertile material, a segment 214 thereabove containing thermally fissionable material, and a segment 216 of fertile material above the segment 214. The segment 216 is connected by a finned coupling member 217 to a shield segment 218 containing a plurality of alternately arranged vertically aligned slugs of iron and beryllium. All of the segments 212, 214, 216 and 218 are steel jacketed as in the previous embodiment.

The thinned coupling member 217 extends through a complementary opening in a wall or partition 222 extending across the tanks 204 and 208. Thus the coupling member accommodates flow of an associated coolant through the associated opening in the wall 222 as hereinafter described.

The various components of the rod 210 are substantially identical with the corresponding components of the reactive or fuel rods 6 described in the previous embodiment and approximately the same number of rods 210 are utilized to sustain a chain reaction.

Above the segment 218 the rod 210 is provided with a thin steel segment 224 extending through complementary openings in a plurality of steel shield plates 226, the lower of said plates being spaced by rings 228 to define coolant spaces or chambers 229.

The upper end of the tank 208 is connected by a ring 230 to a larger tank 232 affording connections to coolant inlet and outlet conduits 234 and 235 disposed respectively above and below the plates 226.

Disposed within the tank 208 externally of the tank 204 are a plurality of reflector rods 236, each comprising a lower segment 238 containing fertile material within a steel jacket. The segment 238 is connected by a finned coupling 240 extending through a complementary opening in the before-mentioned wall 222 to a steel shield segment 242 containing alternately arranged vertically aligned slugs of beryllium and iron within a steel jacket. The segment 242 extends upwardly through complementary openings in the plates 226, and is connected to another steel shield segment 244, which is afforded a fluid-tight seat as at 245 against the top plate 226 to prevent flow of coolant upwardly therethrough. It will be understood that the segment 238 of the reflector rod 236 is approximately identical with the bottom segment of the reflector rod 8 of the previously described embodiment and substantially the same number of rods 236 are used in the present embodiment as in the embodiment of Figs. 1 to 6.

A plurality of upper shield plates 246 are disposed above the plates 226 and are spaced therefrom by inner and outer rings 247 and 248 defining an annular inlet chamber 250 therebetween, said inlet chamber being connected by ports 252 through the ring 247 to a chamber 254 connected by the openings through the plates 226 to the interior of the tank 204. All of the rods 210 and 236 extend upwardly through complementary openings in the plates 246 to the top of the tank 232 for connection (by means not shown) to the top shield plate 246.

A coolant such, as for example, bismuth, mercury, sodium or potassium, or alloys thereof in liquid form is circulated through inlet conduit 234 into the chamber 250 and thence by ports 252 into the chamber 254 and downwardly through the openings in the plates 226 into the tank 204.

The coolant passes from the bottom of the tank 204 through ports 209 into the tank 208 and upwardly therein into a chamber 256 defined by a ring 258 supporting the plates 226 from the tank 230. The rink 258 is provided with a plurality of ports 260 accommodating flow of the coolant from the chamber 256 into an annular chamber 262 disposed between the ring 258 and an outer ring 264, which also affords support for the plates 226. The coolant flows from the chamber 264 into the outlet conduit 235 and is conveyed thereby to any suitable device (not shown) adapted to produce power as in electrical form from the heat of the coolant absorbed from the rods 210 and 236.

It will be understood as in the previously described embodiment, that an outer fast neutron reflector such as that shown at 66 (Fig. 1) is disposed around the tanks 208 and 232 (Fig. 7) to limit escape of fast neutrons therefrom. However, in the embodiment of Fig. 7, the outer neutron reflector is provided with a vertical slot to accommodate the conduits 234 and 235 as the outer reflector is moved upwardly and downwardly for the purposes described in connection with the reflector of the previously described embodiment.

It will be noted that in both the embodiments of Figs. 1 and 7, the coolant flows in series through the reaction tank and through the reflector tank therearound in order to bring the coolant out at a high temperature. It will be understood that if the coolant flowed in parallel through the reactor and reflector tanks, it would be necessary to place the reflector rods extremely close together in order to throttle the flow of coolant, or it would be necessary to throttle this flow in some other manner in order to bring the coolant out at a high temperature. The necessity of this throttling is eliminated by the above-described arrangements wherein the coolant flows in series through the two tanks. It will be noted that the coolant is admitted to the inlet conduit at a temperature slightly above the melting point of the coolant metal, and is withdrawn at a temperature value of at least 450° C. in the arrangements above described.

In Fig. 7 a portion of the coolant flowing through and between the plates 226 cools this part of the shield, and another portion of the coolant which passes upwardly along the rods 236 between the plates 226 remains static therebetween to accommodate cooling of the plates 226 radially outwardly of the rods 210 by conduction to the outside of the tank 232.

Figure 8:
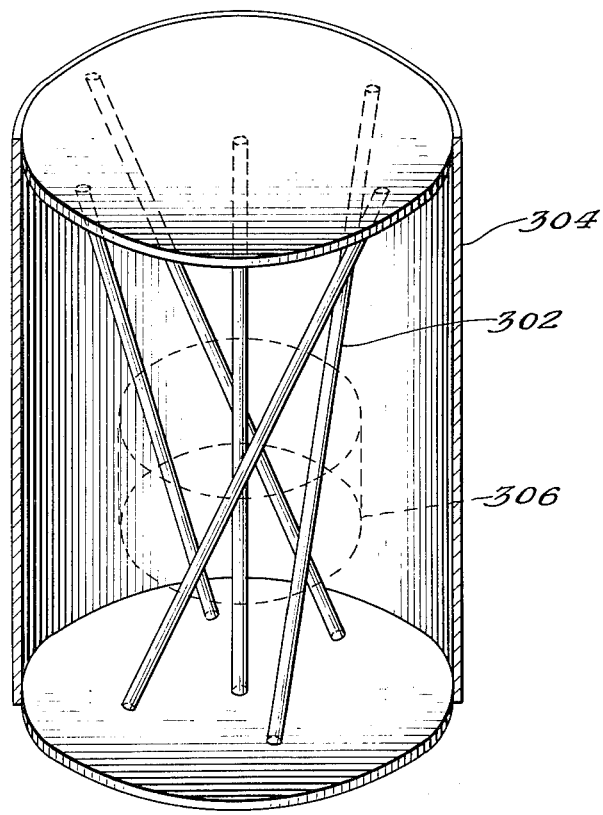
Fig. 8 is a diagram illustrating another modification of the invention, wherein the reactive and reflector rods, such as those shown in the embodiments of Figs. 1 and 7, are arranged in the generating lines of hyperboloids of revolution.

Referring now to Fig. 8, an arrangement is diagrammatically shown wherein the reactive rods, as well as the reflector rods, are indicated at 302 within a tank or container 304. Only a few of the rods are illustrated to show the manner in which the rods are arranged in the generating lines of concentric hyperboloids of revolution. However, in actual practice, the number and construction of the rods in the previous embodiment are utilized. This arrangement is of considerable advantage in that the rods are close together in the reaction zone indicated at 306 corresponding to the zone A of Fig. 1, but well tilted at small angles with respect to each other. Thus, the space between the rods at the top of the system is much greater than in the arrangements shown in Figs. 1 and 7. This accommodates simplification of the handling and keying of the rods inasmuch as they can be keyed at the top of the device rather than the bottom thereof as in the arrangement of Fig. 1. Furthermore, the openings in the various walls through which the rods extend are of increasing diameter at the upper portion of the structure so that a rod with a slight warp or swelling would slide readily out of the device after once being freed from the supporting structure.

It will be understood that the present invention is not restricted to the specific embodiments disclosed or to the theories of nuclear physics set forth inasmuch as many modifications of these embodiments may be conceived by those skilled in the art without departing from the spirit of the invention or the scope of the appended claims; and experimental data later discovered may modify the theories set forth without effecting the operability of the invention disclosed.

What is claimed is:

1. A fast neutron reactor capable of breeding, comprising an internal reactive portion comprising a quantity of equally spaced jacketed rods of a composition containing approximately 90% of thermally fissionable material with the balance of said internal reactive portion substantially occupied by liquid metal coolant; an inner reflector surrounding said internal reactive portion, comprising jacketed rods of fertile material and a liquid metal coolant; a cup-shaped outer reflector partially enclosing said inner reflector comprising jacketed fertile material, said reactive zone and reflectors being substantially free of elements having atomic numbers lower than 11, control means comprising means for raising and lowering said outer reflector, whereby the fraction of neutrons reflected is varied, and a moderating reflector enveloping said outer reflector in close proximity thereto, along the movable boundary thereof.

2. A fast neutron reactor capable of breeding comprising an inner reactive portion in turn comprising a quantity of equally spaced jacketed rods of a composition containing approximately 90% of thermally fissionable material with the balance of said internal reactive portion substantially occupied by a liquid metal coolant; an inner reflector surrounding said internal reactive portion, comprising jacketed rods of fertile material and a liquid metal coolant; a cup shaped outer reflector comprising blocks of jacketed fertile material, said reactive zone and reflectors being substantially free of elements having atomic numbers less than 11; a door hinged to the said outer reflector; a moderating reflector enveloping said outer reflector in close proximity thereto, said moderating reflector having a recess positioned such as to allow swinging motion of said door, and control means for causing said door to swing away from said outer reflector thereby effectively leaving a portion of the outer reflector open for the escape of neutrons.

3. A fast neutron reactor capable of breeding, comprising an internal reactive portion comprising a quantity of equally spaced jacketed rods of a composition containing approximately 90% of thermally fissionable material with the balance of said internal reactive portion substantially occupied by liquid metal coolant; an inner reflector surrounding said internal reactive portion, comprising jacketed rods of fertile material and a liquid metal coolant; a cup shaped outer reflector partially enclosing said inner reflector comprising jacketed fertile material, said reactive zone and reflectors being substantially free of elements having atomic number lower than 11, control means comprising means for varying the fraction of coverage of the said internal reactive portion and inner reflector by said outer reflector, and a moderating reflector enveloping said outer reflector in close proximity thereto.

References Cited in the file of this patent

UNITED STATES PATENTS

| | | |
|---|---|---|
| 2,708,656 | Fermi et al. | May 17, 1955 |
| 2,743,225 | Ohlinger et al. | Apr. 24, 1956 |

FOREIGN PATENTS

| | | |
|---|---|---|
| 861,390 | France | Oct. 28, 1940 |

OTHER REFERENCES

Kelly et al.: Physical Review 73, 1135–9 (1948). Copy in Patent Office Library.

A General Account of the Development of Methods of Using Atomic Energy for Military Purposes, H. D. Smyth, August 1945. Pages 21, 22, 23, 24, 25, 26, 27, 73, 75, 83, 84, 102, 103, 104, 151, 152, 153. Copy in Scientific Library.

Nuclear Reactor Development, published (July 1954) by Atomic Industrial Forum, Inc., 260 Madison Ave., New York 16, N.Y. Page 18.

Principles of Nuclear Reactor Engineering, by Samuel Glasstone. D. Van Nostrand Co., New York, July 1955, pages 832–837.